United States Patent [19]

Healey et al.

[11] Patent Number: 5,485,296
[45] Date of Patent: Jan. 16, 1996

[54] MONITOR UNIT FOR MONITORING AN OPTICAL WAVEGUIDE

[75] Inventors: Peter Healey, Ipswich; David Smith, Woodbridge, both of England

[73] Assignee: British Telecommunications public limited company, London, England

[21] Appl. No.: 227,982

[22] Filed: Apr. 15, 1994

Related U.S. Application Data

[63] Continuation of Ser. No. 834,239, Feb. 20, 1992, abandoned.

[30] Foreign Application Priority Data

Jul. 31, 1989 [GB] United Kingdom .................. 8917422

[51] Int. Cl.⁶ ................................................ G08B 1/00
[52] U.S. Cl. ................................. 359/112; 359/110
[58] Field of Search ....................... 359/109, 110, 359/119, 155, 156, 180, 188, 112, 156; 340/542, 550

[56] References Cited

U.S. PATENT DOCUMENTS

| | | | |
|---|---|---|---|
| 3,761,716 | 9/1973 | Kapron et al. | 359/122 |
| 4,366,565 | 12/1982 | Herskowitz | 385/28 |
| 4,381,137 | 4/1983 | Berg et al. | 385/28 |
| 4,435,849 | 3/1984 | Ilgner et al. | 359/110 |
| 4,475,789 | 10/1984 | Kahn | 385/48 |
| 4,546,345 | 10/1985 | Naito | 340/542 |
| 4,560,246 | 12/1985 | Cotter | 359/182 |
| 4,592,043 | 3/1986 | Williams | 359/152 |
| 4,652,076 | 3/1987 | Unger | 359/127 |
| 4,765,738 | 8/1988 | Henmi | 356/349 |
| 4,942,623 | 7/1990 | Asawa et al. | 359/128 |
| 5,003,623 | 3/1991 | Asawa | 359/128 |
| 5,109,443 | 4/1992 | Hill et al. | 359/124 |
| 5,223,967 | 6/1993 | Udd | 359/119 |
| 5,274,488 | 12/1993 | Udd | 359/119 |

FOREIGN PATENT DOCUMENTS

| | | |
|---|---|---|
| 2038017 | 7/1980 | United Kingdom . |
| 2051355 | 1/1981 | United Kingdom . |
| 2145514 | 3/1985 | United Kingdom . |

*Primary Examiner*—Hezron E. Williams
*Assistant Examiner*—Richard A. Moller
*Attorney, Agent, or Firm*—Nixon & Vanderhye

[57] ABSTRACT

A monitor unit for detecting physical interference of a communications fibre in a transmission system includes a monitor circuit coupled to the communications fibre. A portion of a signal being transmitted along the communications fibre is coupled out of the fibre and into the monitor unit. A filter allows only one of two orthogonal polarization field components to pass through it to the monitor circuit. By detecting fluctuations in the polarization state of the filtered optical signal, the monitor circuit allows the detection of external influences to be determined.

19 Claims, 4 Drawing Sheets

MONITOR UNIT FOR MONITORING AN OPTICAL WAVEGUIDE

RELATED APPLICATIONS

This is a continuation of application Ser. No. 07/834,239 filed Feb. 20, 1992, now abandoned.

BACKGROUND OF THE INVENTION

1. Field of the Invention

The invention relates to a monitor unit for monitoring an optical waveguide and to a communications system incorporating such a monitor unit. The invention relates particularly, but not exclusively, to monitor units and communications systems in which the optical waveguide comprises an optical fibre.

2. Description of the Related Art

It is well known in the art to form a communications system having a communications optical fibre, a transmitter for transmitting data in the form of an optical signal along the communications optical fibre, and a receiver for receiving the signal. A disadvantage of a transmission system of this type is that it does not provide an inherently secure means of transmission in that the process of physically interfering with the communications system is becoming increasingly simple to perform. There is a need, therefore, for means for monitoring communications systems for such interference.

Also, it is often desired to monitor the waveguide for chances caused by other means. For example a sensor may be connected to the waveguide which physically affects the waveguide in response to a chance in some parameter, for example temperature or pressure. In other cases the waveguide may teach or change in response to its environment, for example temperature changes or splice ageing, and it is desired to monitor these changes.

One known way of monitoring a communications system is to apply a corrugated attachment to the outer surface of a fibre at a point at which physical interference of the system is anticipated or at the location of the sensor, the sensor mechanism applying pressure to the corrugations. When the fibre is interfered with or it is activated by the sensor, the corrugations are caused to press onto the outer surface of the fibre thereby causing the loss of some of the signal being received. This reduces the total optical energy of the signal so by monitoring the total optical energy physical interference may be detected. Similarly mode transfers can be caused by environmental influences such as temperature or ground movements acting on the waveguide directly.

SUMMARY OF THE INVENTION

According to the present invention a monitor unit comprises coupling means for coupling a portion of an optical signal from a waveguide to be monitored to a first waveguide and a photodetector, the coupling means and photodetector being arranged such that total optical energy in selected propagation states of the optical signal is detected, and monitoring means responsive to the optical energy detected by the photodetector to provide an indication when a change in total optical energy greater than a predetermined amount is detected.

The propagation states may be polarisation states or transverse states (modes).

When the waveguide to be monitored is an optical fibre, the coupling means may comprise a curved optical waveguide and clamping means for clamping the waveguide to be monitored into a curved position which at least substantially conforms to the inner side of the curved waveguide, the respective refractive indices of the waveguide to be monitored and the curved waveguide and the radius of curvature of the inner surface of the curved waveguide being such that in use optical radiation is leaked from the waveguide to be monitored and coupled from the curved waveguide into the first waveguide. The monitor unit may thus be coupled to the waveguide to be monitored at any convenient point along the said waveguide and in a relatively simple manner.

Alternatively, the coupling means may comprise a second waveguide couplable in series to the waveguide to be monitored, and transversely coupled to the first waveguide at a coupling region. An optical signal propagating along the waveguide to be monitored is coupled into the second waveguide and then a portion of the signal is coupled from the second waveguide into the first waveguide.

When the optical waveguide to be monitored is a multimode waveguide the first waveguide may be a multimode waveguide with the photodetector positioned to detect, preferentially, higher order modes of the optical signal. High order modes in an optical signal are more sensitive to external influences on a waveguide along which the signal is propagating than lower order modes, and thus by positioning the photodetector to detect preferentially the higher order modes, the monitor unit will be more sensitive to the external influences. Conveniently, the photodetector is positioned in a misaligned position relative to the first waveguide in order that it may detect, principally, the high order modes.

Alternatively, the monitor unit may further comprise a filter positioned to filter out, preferentially, lower order modes of the optical signal and a photodetector positioned to detect the remaining modes of the signal. The photodetector may now be positioned in alignment with the first waveguide.

Conveniently, the filter has a substantially circular cross-section, and is positioned coaxially with the first waveguide. Light emerging from the first waveguide will diverge as it leaves the waveguide. Low order modes will diverge to a lesser extent than high order modes. Thus by positioning the filter in alignment with the first waveguide, lower order modes will be prevented from reaching the photodetector, whilst most of the high order modes will reach the photodetector unhindered.

Alternatively, the filter may comprise a knife edge which is positioned off-axis relative to the first waveguide. The filter will then prevent a range of modes from reaching the photodetector, but by appropriately positioning the filter, most of the low order modes may be blocked, whereas most of the high order mode will reach the photodetector.

When the first and second waveguides of such a monitor unit are each polarisation independent single mode waveguides, the extraction means may comprise a filter positioned between the first optical waveguide and an extraction means capable of filtering out one polarisation state to allow one selected polarisation state to pass through. As linearly polarised light is coupled into the communications fibre, its state of polarisation, (SOP) passes through various states of elliptical polarisation due to combinations of linear and circular birefringence and polarisation-coupling perturbations that are randomly distributed along its length. When such light is coupled into the monitor unit, the filter allows only one of the two orthogonal field components to pass, resulting in a polarisation sensitive monitor signal.

The filter may comprise a polarising sheet or wire grid formed from dichroic polarisers. Alternatively it may comprise a birefringent crystal, for example calcite, or a polarised beam splitter, or a Brewster window.

Advantageously, the first waveguide is substantially identical to the waveguide to be monitored, as insertion losses at the points of connection of the monitor unit to the waveguide to be monitored are reduced.

In a monitor unit having a second waveguide transversely coupled to the first waveguide at a coupling region, the filter may comprise the coupling region itself.

The first and second waveguides and the waveguide to be monitored may each comprise lithium niobate substrates having a titanium in-diffused waveguiding area. The principal application of the present invention is envisaged to be with waveguides which comprise optical fibres, for example in optical fibre communications networks.

The monitor unit may be conveniently coupled to a communications optical fibre of a communications system by means of fibre connectors attached to the first waveguide at any convenient point along the fibre.

When a communications fibre is disturbed the state in which the optical signal is propagating changes. For example, the polarisation state in a monomode fibre or the transverse modal state in a multimode fibre. Because only some states are monitored the energy monitored will vary as the disturbance changes the propagation states thus indicating physical interference. The monitor unit may be used in a passive form, in which a portion of the transmitted data signal itself is used for the monitoring purposes. In such a system, interference may be detected only when data is actually being transmitted. Alternatively, the signal portion monitored by the monitor unit may be a portion of a specially transmitted monitor signal which is transmitted purely for monitoring purposes and is arranged not to interfere with any data signals being transmitted. In such a situation, the monitor unit is being used in an active form and will be capable of detecting interference or sensing changes caused by a sensor even when no data is being transmitted.

It has been found that in a typical communications system it is sufficient that the monitoring unit causes 10% of the optical signal to be coupled into the monitor means to allow monitoring.

A plurality of monitor units may be coupled to a communications system at different points along the communications fibre. The location of the physical interference may then also be determined by means of a second monitor unit.

BRIEF DESCRIPTION OF THE DRAWINGS

The invention will now be further described by way of example only with reference to the accompanying drawings in which.

DETAILED DESCRIPTION OF PREFERRED EMBODIMENTS

Figure 1:
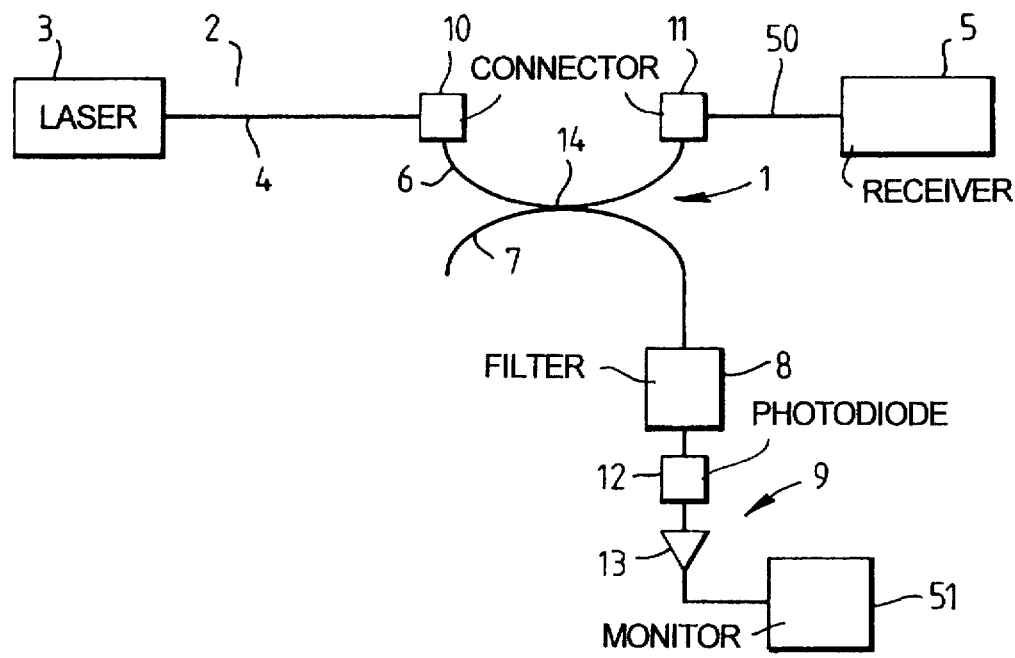
FIG. 1 is a schematic representation of a monitor unit according to the present invention for use with a single mode transmission system in a passive form.

Referring to FIG. 1, a monitor unit according to the invention is indicated generally by the reference number 1. The unit 1 serves to monitor a transmission system 2 for interference. The transmission system 2 comprises a laser 3, coupled to an optical waveguide 4 and a system receiver 5 coupled to an optical waveguide 50. The monitor unit comprises a first waveguide 6 and a second waveguide 7 coupled to one another at a coupling region 14, a filter 8 and a monitor circuit 9. The monitor unit is connected to the transmission system by standard connectors 10, 11 which couple the first waveguide 6 to the waveguides 4 and 50 respectively. The waveguides 4, 6, 7 and 50 are each substantially identical single mode fibres. A signal transmitted from the laser 3 passes through the coupler 1 which couples about 10% of the signal into the second waveguide 7, leaving about 90% of the signal to return to the waveguide 50 and thence to the receiver 5. The portion of the signal coupled into the second waveguide 7 passes through filter 8 which in this embodiment is a polarisation filter. The filter 8 allows only one of the two orthogonal field components to pass through it, resulting in a polarisation sensitive monitor signal. The monitor signal then passes through the monitor circuit 9 which comprises a low-speed, large-area photodiode 12, which allows for non critical alignment, a low noise and low bandwidth preamplifier 13 and a monitoring means 51 to provide an indication when interference with the waveguide 4 is detected.

Figure 3:
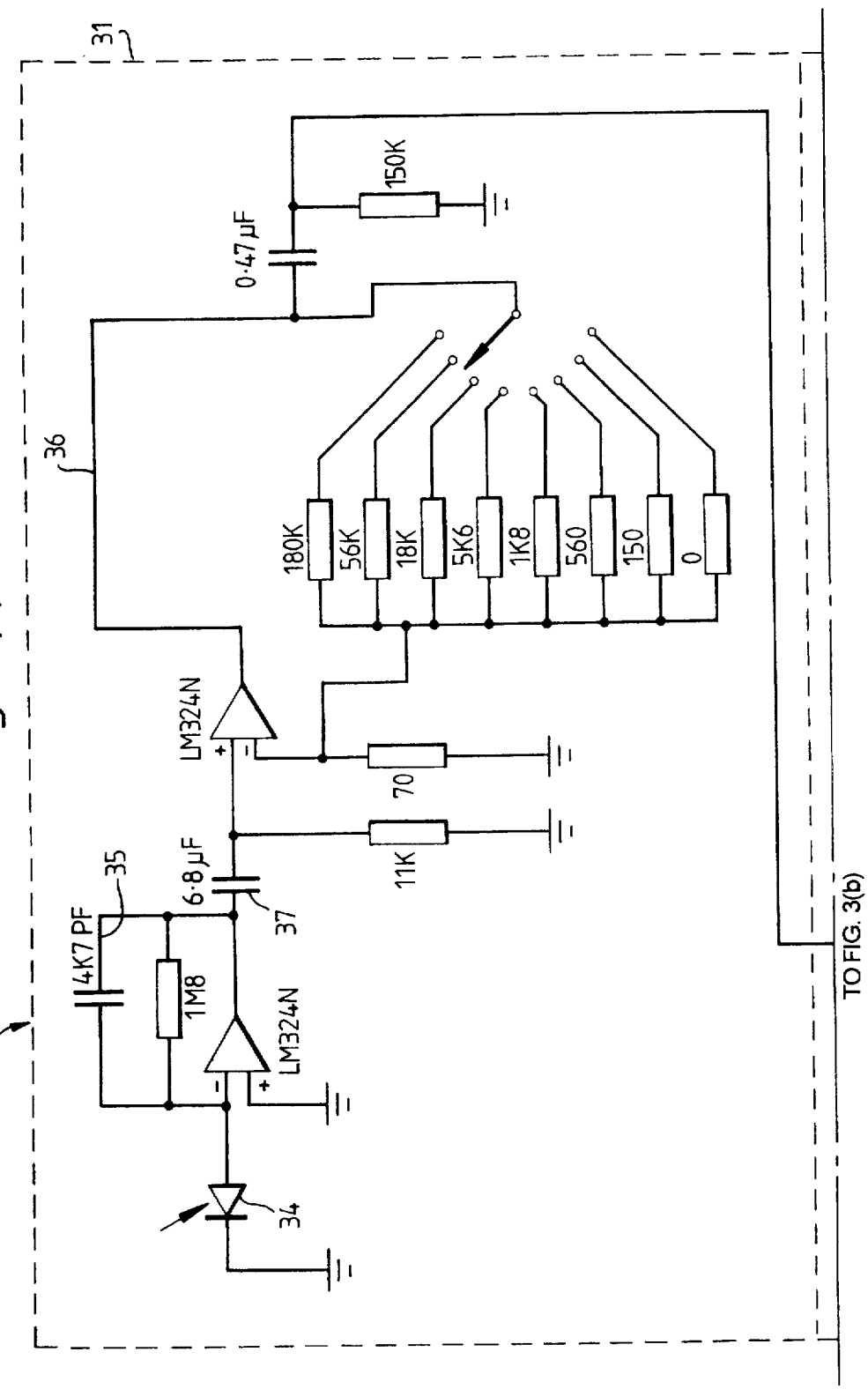
FIGS. 3(a) and 3(b) constitute a schematic diagram of one embodiment of a monitor circuit used in the monitor unit FIG. 1 or 2.

When the transmission waveguide 4 is physically interfered with, the state of polarisation of the optical signal being monitored will fluctuate due to the interference. The monitor circuit 9 will detect such fluctuations, thus allowing the existance of the interference to be determined by, for example, activating a buzzer (see FIG. 3).

Figure 2:
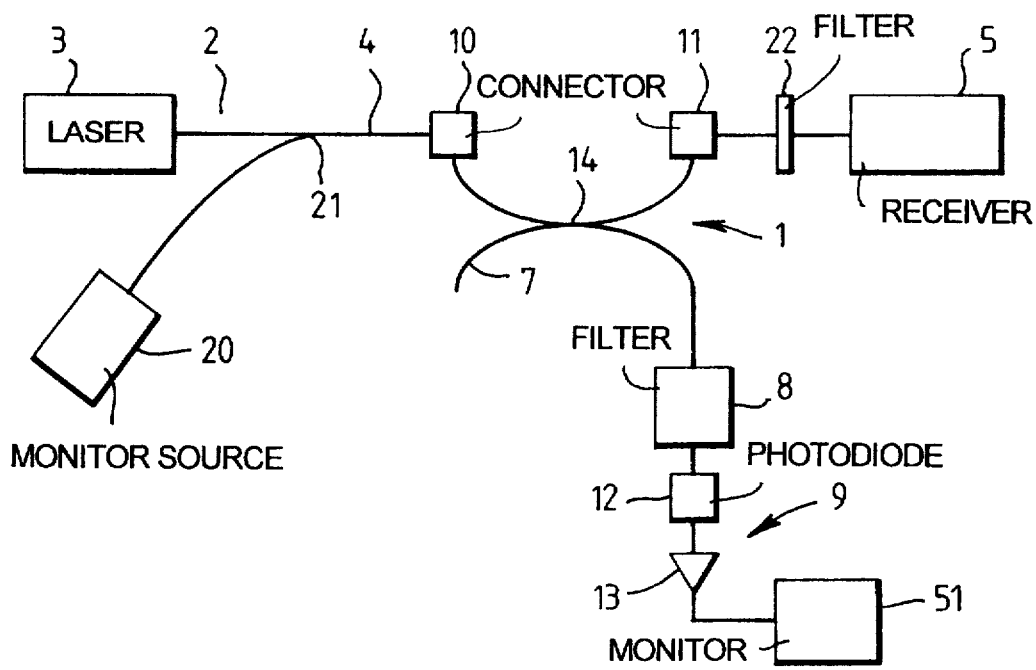
FIG. 2 is a schematic representation of the monitor unit of FIG. 1 adapted for use in an active form.

Referring to FIG. 2, a monitor unit according to the invention is shown connected to an optical transmission system. The system is similar to that of FIG. 1, and corresponding parts have been given the same reference numbers. The system of FIG. 2 additionally comprises a monitor signal source 20 which is a laser coupled to the waveguide 4 by a coupler 21. The source 20 produces a monitor signal which is separate from the signal produced by laser 3 and is arranged such that it does not interfere with the signal produced by the laser 3. In order that the monitor signal does not interfere with the signal produced by laser 3, it is transmitted at a different wavelength to that of the transmitted signal. Alternatively, the monitor signal could be transmitted at the same wavelength as that of the transmitted wavelength, but in an opposite direction to the transmitted signal. The portion of the monitor signal produced by the source 20 rather than the signal produced by laser 3 is monitored by the monitor unit. The monitor unit is here being used in an active form, and can thus detect interference even when no signal is being transmitted by the laser 3. The monitor signal produced by source 20 must be either multiplexed with a signal produced by laser 3 or transmitted via a separate fibre intimately associated with waveguide 4.

A filter 22 filters out the monitor signal to ensure that it is not received by the receiver 5. Alternatively, the monitor signal could be mixed with a local optical signal, for example by using coherent detection techniques. Such techniques are polarisation sensitive.

Figure 3B:
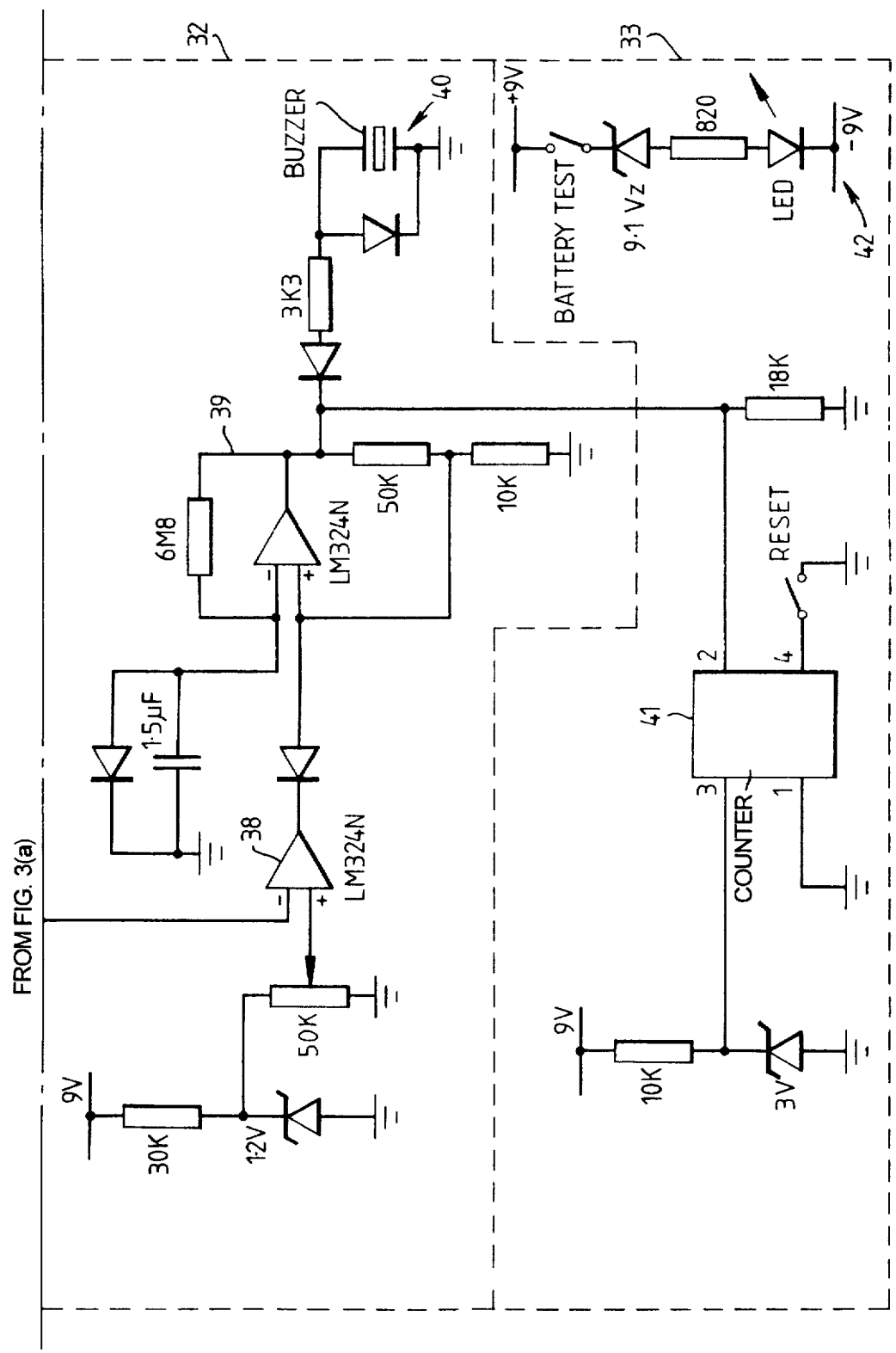

Referring to FIGS. 3(a) and 3(b), an embodiment of the monitor means 51 used in the monitor circuit 9 of FIG. 1 or 2 is shown. The monitor means 51 comprises three sections 31, 32, 33. Section 31 comprises a photodetector 34 and an associated transimpedance preamplifier 35 connected to a switched gain amplifier 36 by a capacitor 37. Section 31 performs the opto-electronic conversion and low-noise amplification of the monitor signal. An electric pass-band of 2 to 17 Hz has been chosen to give maximum sensitivity to the monitor signal whilst minimising the effects of background fluctuations and electrical noise. The switched gain amplifier 36 allows a degree of sensitivity adjustment and ensures that the output voltage swing of section 31 is within the correct range for section 32 for a wide range of input optical power levels. Section 32 comprises a voltage comparator 38 which is triggered when the output voltage swing of section 31 exceeds a preset threshold, followed by a monostable 39 which ensures a fixed duration trigger pulse to drive both a buzzer 40 and section 33. Section 33 comprises a resettable counter 41 which gives an indication of the number of 'alarm' events and is useful if the monitor unit is left unattended. A battery test circuit 42 ensures that the monitor unit is operated within its correct voltage range.

Figure 4:
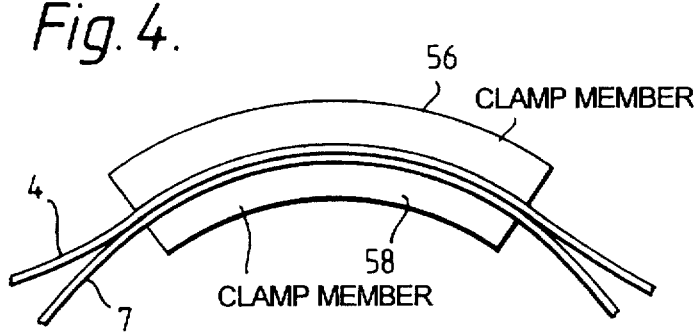
FIG. 4 depicts one exemplary coupling arrangement for use with this invention.

Referring to FIG. 4 a coupling means for coupling an optical signal from the waveguide to be monitored 4 comprises a clamping means 56 and 58 which co-operate to hold the fibre 4 and an optical fibre 7 of the monitor unit (not shown) such that optical radiation is leaked from the optical fibre 4 and couples into the fibre 7.

Figure 5:
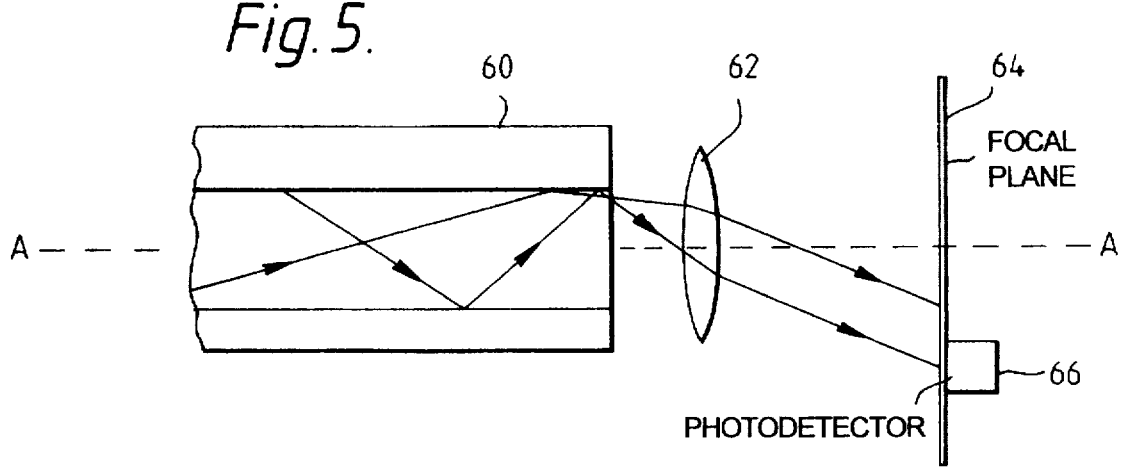
FIG. 5 depicts one exemplary arrangement for monitoring higher order modes in accordance with this invention.

FIG. 5 shows an arrangement for monitoring the optical power in higher order nodes propagating in an optical fibre 60. The light exiting the fibre 60 will be at a greater angle to the fibre axis A—A for the higher modes. A lens 62 will therefore focus the different modes to different regions of the lenses focal plane 64. By positioning a photodetector 66 to preferentially detect signals to the periphary of focal plane 64 higher modes are detected preferentially.

Figure 6:
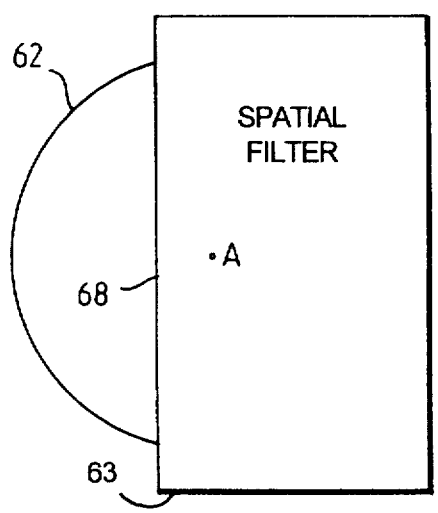
FIGS. 6 and 7 are views taken along axis A—A of FIG. 5 depicting two possible filter structures.
Figure 7:
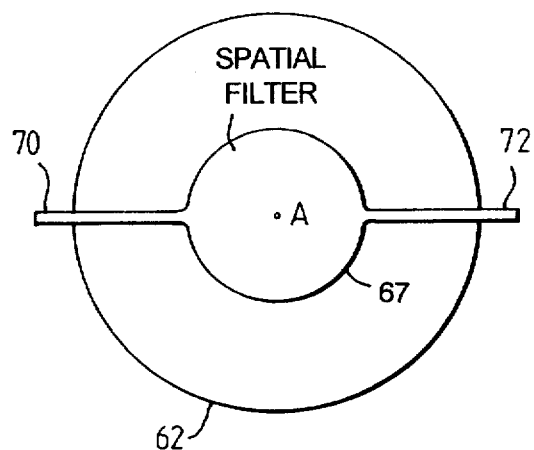

An alternative arrangement of preferentially detecting higher order modes is to place a spatial filter between the lens 62 and focal plane 64. FIGS. 6 and 7 are views along the axis A—A of FIG. 5 from the focal plane 64 towards the lens 62 in which blocking filter 65 or 67 has been interposed between the lens 62 and focal plane 64, respectively. The filter 63 of FIG. 6 is a blocking filter having a knife-edge 68 positioned to the side of the optical axis A—A, perpendicular to it and blocking all light to the right of the edge 68 from reaching the local plane. The filter 67 of FIG. 7 is a circular filter centred on, and perpendicular to, to optical axis A—A supported in position by a pair of support arms 70 and 72.

In each of these arrangement of FIG. 6 and FIG. 7, a greater proportion of higher order modes reach the focal plane 64 of FIG. 5 than lower order modes. A photodetector can therefore be arranged to receive all the light reaching the focal plane 64 and still preferentially detect higher modes propagating in a fibre.

We claim:

1. A monitor unit for monitoring an optical signal carried by a waveguide to be monitored and having a plurality of propagation states, said monitor unit comprising:

a first waveguide optically coupled to said waveguide to be monitored;

a photodetector;

coupling means optically coupled to said first waveguide and to said photodetector for coupling a portion of the optical signal from the waveguide to be monitored to the first waveguide and the photodetector, the coupling means and photodetector including means for detecting at least one but less than all propagation states of the optical signal; and monitoring means responsive to the optical energy detected by the photodetector to provide an indication when a change in said optical energy greater than a predetermined amount is detected thereby detecting the presence of physical tampering with said waveguide to be monitored at some point between an optical signal transmitter and an optical signal receiver coupled to opposite ends of the waveguide to be monitored.

2. A monitor unit as in claim 1 wherein:

the waveguide to be monitored is an optical fibre and the coupling means comprises a curved optical waveguide and clamping means for clamping the waveguide to be monitored into a curved position whereat the waveguide to be monitored at least substantially conforms to the inner side of the curved waveguide, the respective refractive indices of the waveguide to be monitored and the curved waveguide, and the radius of curvature of the inner surface of the curved waveguide being such that in use, optical radiation is leaked from the waveguide to be monitored coupled at the curved waveguide into the first waveguide.

3. A monitor unit as in claim 1 wherein the coupling means comprises a second waveguide coupled in series to the waveguide to be monitored, and transversely coupled to the first waveguide at a coupling region.

4. A monitor unit as in claim 1 wherein the first waveguide is a multimode waveguide and the propagation states comprise different order modes of the optical signal, the photodetector being positioned to detect a high order mode of the optical signal and positioned not to detect the lowest order mode of the optical signal.

5. A monitor unit as in claim 1 wherein the propagation states comprise different order modes of the optical signal and a filter is positioned to filter out lower order modes of the optical signal.

6. A monitor unit as in claim 5 wherein the filter has a substantially circular cross-section, and is positioned coaxially with the first waveguide.

7. A monitor unit as in claim 5 wherein the filter comprises a knife edge and is positioned off-axis relative to the first waveguide.

8. A monitor unit as in claim 5 wherein the filter comprises the coupling region.

9. A communications system comprising a communications optical waveguide, a transmitter capable of transmitting an optical signal along the communications optical waveguide, a receiver capable of receiving the optical signal and a monitor unit as in claim 5 wherein the communications optical waveguide comprises a multimode optical fibre substantially identical to the first optical waveguide.

10. A monitor unit as in claim 1 wherein the first waveguide and said coupling means are each polarisation independent single mode waveguides and the propagation states comprise different polarisation states, the monitor unit further comprising a filter capable of filtering out one polarisation state to allow one selected polarisation state to pass to the photodetector.

11. A monitor unit as in claim 10 wherein the first waveguide is substantially identical to the waveguide to be monitored.

12. A communications system a communications optical waveguide, a transmitter capable of transmitting an optical signal along the communications optical waveguide, a receiver capable of receiving the optical signal and a monitor unit as in claim 10 wherein the communications optical waveguide comprises a single mode optical fibre substantially identical to the first optical waveguide.

13. A monitor unit as in claim 1 wherein each of the waveguides is an optical fibre.

14. A communications system comprising a communications optical waveguide, a transmitter capable of transmitting an optical signal along the communications of optical waveguide, a receiver capable of receiving the optical signal, and a monitor unit as in claim 1 coupled to the communications optical waveguide.

15. A communications system according to claim 12 wherein the first optical waveguide is coupled to the communications optical waveguide such that the coupler is positioned between the transmitter and the receiver.

16. A communications system as claimed in claim 12 wherein 10% of the optical signal is coupled into the coupler.

17. An optical communications line security monitor for detecting the presence of physical tampering with an optical communications channel which causes changes in the relative power distribution between different modes of the optical signal being carried by the optical communications channel at some point between an optical signal transmitter and an optical signal receiver coupled to opposite ends of said optical communications channel, said monitor comprising:

a selective optical signal mode coupler disposed to extract from said optical communications channel at least one mode but not all modes of optical signal propagation being carried by the optical communications channel;

an optical-to-electrical transducer connected to said mode coupler for converting said selectively coupled mode(s) of optical signals to an electrical signal; and a monitor circuit connected to said transducer to monitor said electrical signal and to detect changes therein greater than a predetermined amount thereby detecting the presence of physical tampering with the optical communications channel at some point between an optical signal transmitter and an optical signal receiver coupled to opposite ends of the communications channel.

18. A method for monitoring an optical signal carried by a waveguide to be monitored and having a plurality of propagation states, said method comprising:

optically coupling a first waveguide to said waveguide to be monitored;

optically coupling a portion of the optical signal from the first waveguide to a photodetector which detects at least one but less than all propagation states of the optical signal passing along said waveguide to be monitored; and responsive to the optical energy detected by the photodetector, providing an indication when a change in said optical energy greater than a predetermined amount is detected thereby detecting the presence of physical tampering with said waveguide to be monitored at some point between an optical signal transmitter and an optical signal receiver coupled to opposite ends of the waveguide to be monitored.

19. A method for detecting the presence of physical tampering with an optical communications channel which causes changes in the relative power distribution between different modes of an optical signal being carried by the optical communications channel at some point between an optical signal transmitter and an optical signal receiver coupled to opposite ends of said optical communications channel, said method comprising:

extracting from said optical communications channel at least one mode but not all modes of optical signal propagation being carried by the optical communications channel;

converting said selectively coupled mode(s) of optical signals to an electrical signal; and detecting changes in the electrical signal greater than a predetermined amount thereby detecting the presence of physical tampering with the optical communications channel at some point between an optical signal transmitter and an optical signal receiver coupled to opposite ends of the communications channel.

* * * * *